(12) United States Patent
Egedal et al.

(10) Patent No.: US 11,767,820 B2
(45) Date of Patent: Sep. 26, 2023

(54) ESTIMATING WIND SPEED

(71) Applicant: Siemens Gamesa Renewable Energy A/S, Brande (DK)

(72) Inventors: Per Egedal, Herning (DK); Martin Nygaard Kragelund, Børkop (DK)

(73) Assignee: SIEMENS GAMESA RENEWABLE ENERGY A/S

(*) Notice: Subject to any disclaimer, the term of this patent is extended or adjusted under 35 U.S.C. 154(b) by 108 days.

(21) Appl. No.: 17/311,731

(22) PCT Filed: Oct. 31, 2019

(86) PCT No.: PCT/EP2019/079844
§ 371 (c)(1),
(2) Date: Jun. 8, 2021

(87) PCT Pub. No.: WO2020/120020
PCT Pub. Date: Jun. 18, 2020

(65) Prior Publication Data
US 2022/0025856 A1    Jan. 27, 2022

(30) Foreign Application Priority Data

Dec. 13, 2018  (EP) .................................. 18212396

(51) Int. Cl.
*F03D 7/02*  (2006.01)
*F03D 1/06*  (2006.01)

(52) U.S. Cl.
CPC .......... *F03D 7/0232* (2013.01); *F03D 1/0641* (2013.01); *F05B 2240/3052* (2020.08);
(Continued)

(58) Field of Classification Search
CPC ................. F03D 7/0232; F03D 1/0641; F05B 2240/3052; F05B 2260/84;
(Continued)

(56) References Cited

U.S. PATENT DOCUMENTS 8,105,029 B2 * 1/2012 Egedal .................... F03D 7/022
                                                        416/33
8,449,255 B2 * 5/2013 Tadayon ................... F16H 1/28
                                                        416/37
(Continued)

FOREIGN PATENT DOCUMENTS

EP    2715122 A2    4/2014
EP    3290688 A1    3/2018
(Continued)

OTHER PUBLICATIONS

Barlas T.K. et al: "Review of state of the art in smart rotor control research for wind turbines", Progress in Aerospace Sciences, vol. 46, No. 1, pp. 1-27, XP055540609, GB ; ISSN: 0376-0421, DOI: 10.1016/j.paerosci.2009.08.002; paragraph [4.1.1]-[4.1.3]; 2010.
(Continued)

*Primary Examiner* — Pedro J Cuevas
(74) *Attorney, Agent, or Firm* — Schmeiser, Olsen & Watts LLP

(57) ABSTRACT

Provided is a method of estimating a value of wind speed a wind turbine is subjected to, the wind turbine having a rotor with rotor blades at least one having an adaptable flow regulating device installed, the method including: obtaining values for power output of the wind turbine, rotor speed of the rotor, and pitch angle of the rotor blades; obtaining state information of the adaptable flow regulating device; and estimating the value of the wind speed based on the values for power output, rotor speed, pitch angle and the state information of the adaptable flow regulating device.

14 Claims, 2 Drawing Sheets

Figure 1:
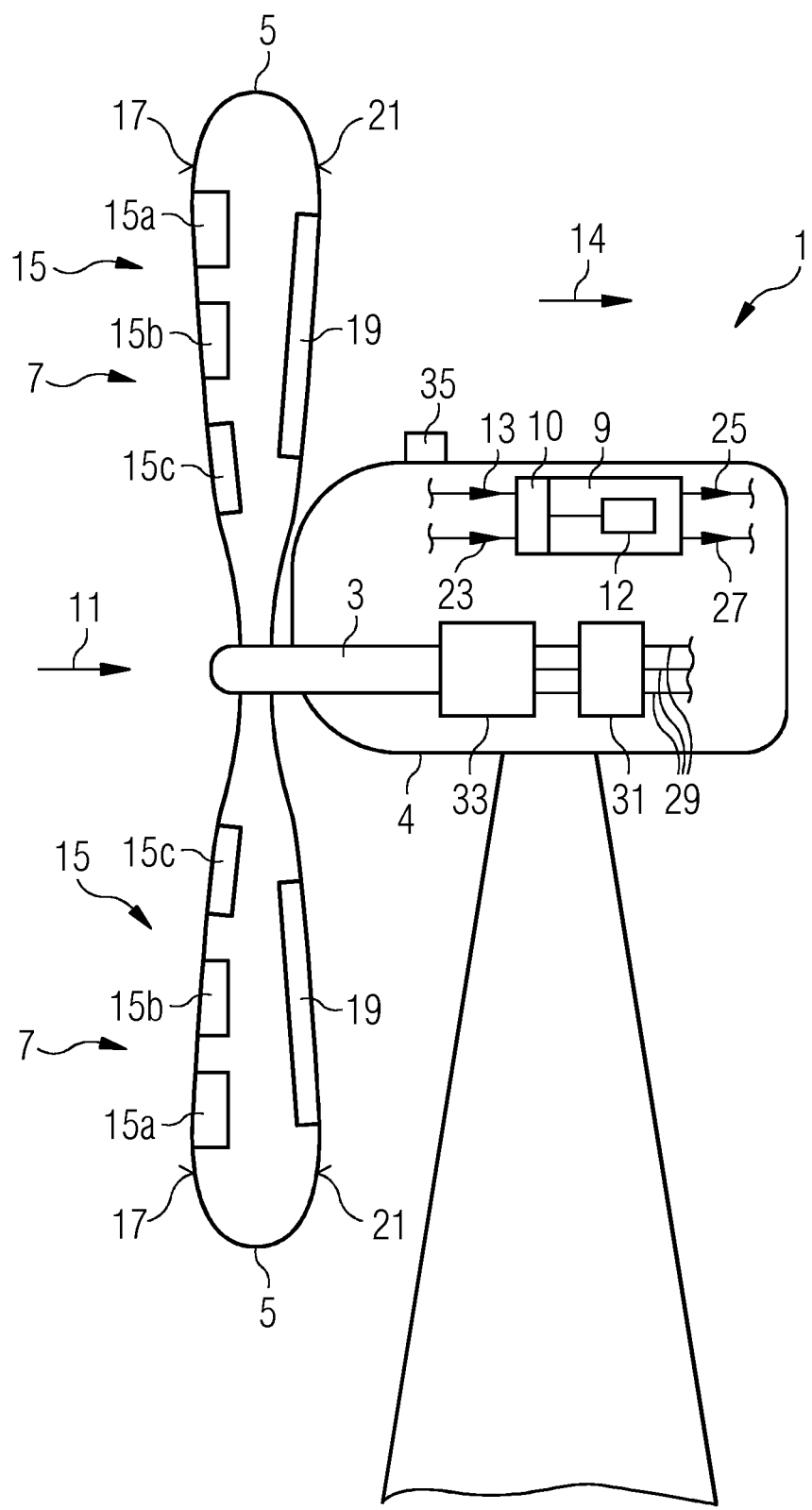

(52) U.S. Cl.
CPC ..... *F05B 2260/84* (2013.01); *F05B 2270/322* (2013.01); *F05B 2270/327* (2013.01); *F05B 2270/328* (2013.01); *F05B 2270/335* (2013.01)

(58) Field of Classification Search
CPC .......... F05B 2270/322; F05B 2270/327; F05B 2270/328; F05B 2270/335
See application file for complete search history.

(56) References Cited

U.S. PATENT DOCUMENTS

| | | | | |
|---|---|---|---|---|
| 9,316,205 | B2* | 4/2016 | Baker | F03D 1/0675 |
| 9,335,229 | B2* | 5/2016 | Baker | F03D 15/15 |
| 9,488,157 | B2* | 11/2016 | Baker | F03D 7/04 |
| 9,556,850 | B2* | 1/2017 | Goodman | F03D 7/0224 |
| 9,739,265 | B2* | 8/2017 | Betran Palomas | F03D 7/0224 |
| 10,968,888 | B2* | 4/2021 | Christensen | F03D 7/0232 |
| 10,989,166 | B2* | 4/2021 | Madsen | F03D 1/0641 |
| 11,014,652 | B1* | 5/2021 | Fine | F03D 7/022 |
| 11,274,651 | B2* | 3/2022 | Lehmann Madsen | F03D 1/0641 |
| 11,536,247 | B2* | 12/2022 | Vaddi | F03D 17/00 |
| 2009/0257873 | A1* | 10/2009 | Egedal | F03D 7/046 416/31 |
| 2011/0229322 | A1* | 9/2011 | Tadayon | F03D 80/40 416/169 R |
| 2012/0078518 | A1 | 3/2012 | Krishna | |
| 2013/0267375 | A1* | 10/2013 | Tadayon | F16H 1/28 475/337 |
| 2014/0271185 | A1* | 9/2014 | Baker | F03D 1/0675 702/41 |
| 2014/0271186 | A1* | 9/2014 | Baker | F03D 7/04 416/42 |
| 2014/0271193 | A1* | 9/2014 | Baker | F03D 17/00 702/41 |
| 2015/0030449 | A1* | 1/2015 | Betran Palomas | F03D 7/0232 416/1 |
| 2015/0132130 | A1* | 5/2015 | Brown | F03D 7/022 416/43 |
| 2016/0305403 | A1 | 10/2016 | Zheng et al. | |
| 2017/0218916 | A1* | 8/2017 | Lehmann Madsen | F03D 1/0641 |
| 2017/0314531 | A1* | 11/2017 | Madsen | F03D 1/0641 |
| 2018/0163698 | A1* | 6/2018 | Miranda | F03D 1/0675 |
| 2018/0335018 | A1* | 11/2018 | Cao | G05B 23/0286 |
| 2019/0368467 | A1* | 12/2019 | Christensen | F03D 1/06 |
| 2021/0115895 | A1* | 4/2021 | D'Amato | F03D 7/045 |
| 2021/0115896 | A1* | 4/2021 | Deshpande | F03D 7/043 |
| 2021/0123413 | A1* | 4/2021 | Vaddi | F03D 7/0292 |
| 2021/0363961 | A1* | 11/2021 | Hall | F03D 7/02 |
| 2022/0009618 | A1* | 1/2022 | Fine | B64C 21/10 |
| 2022/0018334 | A1* | 1/2022 | Egedal | F03D 7/043 |
| 2022/0025853 | A1* | 1/2022 | Egedal | F03D 7/0252 |
| 2022/0034297 | A1* | 2/2022 | Egedal | F03D 7/0276 |
| 2022/0082082 | A1* | 3/2022 | Esbensen | F03D 7/0236 |
| 2022/0220934 | A1* | 7/2022 | Lehmann Madsen | F03D 1/0641 |
| 2022/0325691 | A1* | 10/2022 | Lehmann Madsen | F03D 1/0641 |

FOREIGN PATENT DOCUMENTS

| | | | | |
|---|---|---|---|---|
| EP | 3667067 | A1* | 6/2020 | F03D 17/00 |
| EP | 3667075 | A1* | 6/2020 | F03D 1/0641 |
| EP | 3922841 | A1* | 12/2021 | F03D 7/0232 |
| EP | 3867522 | B1* | 6/2022 | F03D 17/00 |
| WO | 0015961 | A1 | 3/2000 | |
| WO | 2018001434 | A1 | 1/2018 | |
| WO | WO-2020120020 | A1* | 6/2020 | F03D 1/0641 |
| WO | WO-2021249822 | A1* | 12/2021 | F03D 7/0232 |

OTHER PUBLICATIONS

Pechlivanoglou Georgios et al: "Passive and active flow control solutions for wind turbine blades", XP055597941, Retrieved from the Internet: URL:https://depositonce.tu-berlin.de/bitstream/11303/3784/1/Dokument 5.pdf [retrieved on Jun. 19, 2019], paragraph [09.4]; 2013.

International Search Report and Written Opinion of the International Searching Authority dated Feb. 11, 2020 for Application No. PCT/EP2019/079844.

European Search Report and Written Opinion of the European Searching Authority dated Jun. 28, 2019 for Application No. 18212396.8.

* cited by examiner

ESTIMATING WIND SPEED

CROSS-REFERENCE TO RELATED APPLICATIONS

This application claims priority to PCT Application No. PCT/EP2019/079844, having a filing date of Oct. 31, 2019, which is based off of EP Application No. 18212396.8, having a filing date of Dec. 13, 2018, the entire contents both of which are hereby incorporated by reference.

FIELD OF TECHNOLOGY

The following relates to a method and an arrangement of estimating a value of wind speed a wind turbine is subjected to, the wind turbine having a rotor with rotor blades at least one having an adaptable flow regulating device installed. Furthermore, embodiments of the present invention relate to a wind turbine having at least one rotor blade with an adaptable flow regulating device and an arrangement for estimating a value of a wind speed.

BACKGROUND

WO 00/15961 discloses a wind turbine blade with vortex generator projecting from its lee surface for controlling the boundary layer separation. By arranging the fins of the vortex generator at alternative positive and negative angles in relation to the flow direction, counter-rotating vortexes along the blade profile are generated. As a result, further energy is supplied to the boundary layer adjacent to the surface of the blade such that the wind speed at which the airstream around the blade profile leaves the surface of the blade and the blade stalls is increased.

EP 3 290 688 A1 discloses a method of controlling a rotational speed of a rotor of a wind turbine having a rotor with blades connected thereon, at least one blade including a blade profile changing equipment, wherein the blade profile is changed dependent on a rotational speed deviation of an actual rotational speed of the rotor from a reference rotational speed. The blade profile changing equipment may comprise an adjustable spoiler or a flap, in particular mounted at a rear edge of the blade, the flap extending and defining a rear end portion of a suction side surface.

Nowadays, rotor blades may be equipped with add-on, like a spoiler and/or a flap, which may affect or even regulate the flow around or close to the blade for improving the performance, such as improving the aerodynamic properties and finally increasing power output or simplifying the control of the wind turbines.

Providing estimates of rotor mean wind speed and in particular also available power output of the wind turbine may be important for operating wind turbines. For example, operators of the wind turbines may be compensated by the grid operator if they are requested to curtail their wind turbine to balance the grid. Conventionally, the rotor mean wind speed is estimated based on rotor characteristics (power tables or Cp tables) and measured online data from the turbine. For example, tables with power as a function of wind speed, rotor speed and pitch angle may have been used. The rotor mean wind speed may have been obtained utilizing the relation between power, wind speed, rotor speed and pitch angle which may have been set up previously. Therein, the power output, the rotor speed and the pitch angle may be measured from which the wind speed may then be inferred. The available power may have then been obtained by looking up the estimated rotor mean wind speed in a wind-to-power curve generated from optimal operating trajectories for rotor speed-power and power-pitch.

However, it has been observed that the derived power in not all circumstances corresponds to the true or actual power which could be output by the wind turbine.

Thus, there may be a need for a method and an arrangement of estimating a value of a wind speed a wind turbine is subjected to, wherein the wind turbine has a rotor with rotor blades at least one having an adaptable flow regulating device installed, wherein the wind speed is estimated to a higher accuracy than in the state of the art.

SUMMARY

According to an embodiment of the present invention, it is provided a method of estimating a value of wind speed a wind turbine is subjected to, the wind turbine having a rotor with rotor blades at least one having an adaptable flow regulating device installed, the method comprising: obtaining values for power output of the wind turbine, rotor speed of the rotor, and pitch angle of the rotor blades; obtaining state information of the adaptable flow regulating device; and estimating the value of the wind speed based on the values for power output, rotor speed, pitch angle and the state information of the adaptable flow regulating device.

The method may for example be performed by a software and/or hardware module within a wind turbine controller or a wind park controller. The value of the wind speed the wind turbine is subjected to may relate to the value of the wind speed which impacts onto the wind turbine, in particular in an area covered by the rotor blades, which is unaffected by the wind turbine. In particular, the value of the wind speed, which is estimated by the method, may thus relate to the value of the wind speed which effectively impacts on the rotor blades. The value of the wind speed estimated may correspond or may be equal to the rotor mean wind speed, i.e. an average of wind speeds the rotor (in particular including the rotor blades) is subjected to. The value of the wind speed estimated may in particular relate to the value of the wind speed as is present just upstream the plane spanned by the rotor blades, i.e., a plane perpendicular to the rotation axis or perpendicular to the rotor of the wind turbine.

A wind speed sensor installed for example at the nacelle of the wind turbine may not be capable of accurately measuring or determining the value of the wind speed upstream of the rotor blades, since the rotating rotor blades influence the air flow such that the wind speed downstream the plane of the rotor blades is different from the value of the wind speed upstream the plane of the rotor blades.

The adaptable flow regulating device may be different from the conventional mechanism of adjusting the blade pitch angle of the blades. The adaptable flow regulating device may be a device in addition to the blade pitch mechanism which affects the flow characteristics of the air around or close to the surfaces of the rotor blades.

The adaptable flow regulating device may be adaptable in the sense that the device may be in one of plural different states, each state having a corresponding flow characteristics. The flow regulating device may comprise one or more portions. The flow regulating device may be installed at any position of an outside surface of the blade, for example at a suction side, at a pressure side, at a leading edge or at a trailing edge or a combination thereof. The adaptable flow regulating device may for example comprise several portions some of which are installed on the suction side and/or some of which are installed at the pressure side in any combination. For adapting the flow regulating device, for example a protrusion height of a portion of the regulating device may for example be changed, the protruding height representing the height by which an outside surface of the flow regulating device protrudes from surrounding surface portions of the rotor blade. Alternatively or additionally, the adaptation may involve changing a tilt angle by which an active surface portion of the flow regulating device is tilted relative to the surface of the rotor blade. Also, a combination of changing a protrusion height and changing a tilt angle is possible for adapting the flow regulating device, in particular if the flow regulating device comprises several portions of different kinds.

According to a particular embodiment of the present invention, the adaptable flow regulating device may comprise several adaptable flow regulating portions installed along (the longitudinal direction) of the rotor blade.

The value of the power output may for example be obtained from measurements of current and/or voltage at an output terminal of the wind turbine, for example an output terminal of a converter of the wind turbine, which is connected to the generator of the wind turbine. The rotor speed of the rotor may for example be measured using for example an encoder or measured using electrical quantities, such as measured electrical quantities. The pitch angle of the rotor blades may be obtained from a pitch angle adjustment mechanism, in particular using a pitch angle setting or a measured pitch angle.

The state information of the adaptable flow regulating device may relate to any information indicative of the state of the adaptable flow regulating device. The state may relate to the structural state of the flow regulating device, for example a tilt angle and/or protrusion height and/or degree of filling of an inflatable bag or hose which is used to achieve different adaptations of the flow regulating device. The state information may relate to the aerodynamic state of the adaptable flow regulating device, in particular in relation to the aerodynamic of the wind turbine blade. The adaptable flow regulating device may comprise a blade add-on.

Estimating the value of the wind speed based on the values of power output, rotor speed, pitch angle and the state information of the adaptable flow regulating device may involve to employ for example a mathematical function and/or a look-up table or in general a relationship relating different values for power output, rotor speed and pitch angle and different values of the state information of the adaptable flow regulating device to a corresponding value of the wind speed.

Since the state of the adaptable flow regulating device affects the operational characteristics of the wind turbine, in particular affects the power output and/or rotor speed, taking into account the state information of the adaptable flow regulating device, may improve the accuracy of the estimated value of the wind speed. Later on, the estimated value of the wind speed may be utilized in different control processes for controlling the wind turbine.

According to an embodiment of the present invention the state information of the adaptable flow regulating device comprises information regarding an activation level of the adaptable flow regulating device.

The activation level of the adaptable flow regulating device may relate to the degree of influencing the airflow around or close to the rotor blade due to the flow regulating device. For example, the adaptable flow regulating device may be or may comprise an entirely retracted state in which the airflow around or close to the rotor blade is not changed at all compared to the mere rotor blade. The more the adaptable flow regulating device protrudes from the surrounding surface of the rotor blade and/or the more an active surface portion of the adaptable flow regulating device is tilted out of a surface of the rotor blade, the higher the activation level may be. Taking into account the activation level for estimating the value of the wind speed may improve the accuracy of estimating the value of the wind speed even further. The adaptable flow regulating device may provide or enable a continuum of different states having different activation levels or may provide discrete stages or steps of adjustments (for example in angle steps or height steps).

According to an embodiment of the present invention the adaptable flow regulating device or at least one portion of several adaptable flow regulating portions is adjustable to be in at least two states, in particular in more than two states, representing different activation levels, the state information being indicative of the respective activation level.

If the flow regulating device is adjustable in exactly two states, one state may be an off-state and the other state may be an on-state meaning no affection or maximum affection, respectively, of the influence on the airflow close to or around the rotor blade. If the flow regulating device has only two states, the method may be simplified.

According to an embodiment of the present invention the adaptable flow regulating device comprises several adaptable flow regulating portions installed along the rotor blade, wherein the state information of the adaptable flow regulating device comprises state information of at least one, in particular all, portion(s) of the several adaptable flow regulating portions.

The several adaptable flow regulating portions installed along (in particular the longitudinal direction) the rotor blade may be set to be in different states. For example, some of the portions may be in an on-state, others may be in an off-state. These different states may then all be considered and may be comprised in the state information of the adaptable flow regulating device. For example, depending on the settings of the plural adaptable flow regulating portions, the airflow close to the root of the blade may be affected (not affected) or the airflow close to the tip of the rotor blade may be not affected (affected) or vice versa.

According to an embodiment of the present invention the adaptable flow regulating device comprises at least one adaptable spoiler installed at at least one of the rotor blades, in particular at a leading edge of a suction surface; and/or at least one adaptable flap installed at at least one of the rotor blades, in particular at a trailing edge of a suction surface.

The spoiler may comprise a face (or airfoil) installed along the leading edge of the suction surface of the blade and may be raised for reducing lift and increasing drag. The raising of the spoiler may thereby correspond to the adaptation of the flow regulating device. The degree of raising or turning the spoiler may correspond to different activation states of the spoiler.

The flap may be installed along the trailing edge of the suction surface and may be turned or tilted for changing the flow affecting influence, thereby representing the adaptation of the flow regulating device. The spoiler as well as the flap may be configured to have several (e.g., independent from each other) portions along the rotor blade which may all be separately controlled for adaptation, wherein their settings regarding the individual state may all be comprised within the state information of the adaptable flow regulating device. Spoiler and flap may be provided in combination. Thereby, conventionally known flow regulating devices may be supported by the method.

According to an embodiment of the present invention the adaptable flow regulating device comprises an inflatable bag or hose which is inflatable using a fluid thereby adjusting a protrusion height and/or a tilt angle of an airfoil portion of the flow regulating device from a surrounding surface of the rotor blade, wherein the state information of the adaptable flow regulating device comprises information about a degree of filling or inflation or pressure of the bag or hose. Inflation of a bag or a hose to adapt the flow regulating device may be a suitable and simple method which is conventionally known.

According to an embodiment of the present invention estimating the value of the wind speed includes deriving a relationship, in particular in form of a look up table, between wind speed and the values for power output, rotor speed, pitch angle and the state information of the adaptable flow regulating device.

The relationship may have been obtained offline previously. Thereby, for example, one or more measurements and/or simulations may have been performed. The relationship may be stored in a computer-readable form accessible for example by a processor which may for example execute the estimation method. When the relationship has been derived previously, the estimation method may be accelerated.

According to an embodiment of the present invention deriving the relationship includes performing a simulation of the dynamics and/or aerodynamics and/or electrical behaviour of the wind turbine. The simulation of the dynamics and/or aerodynamics and/or the electrical behaviour of the wind turbine may model the wind turbine in different operation modes under different environmental conditions and in particular under different wind speeds. The simulation may be supported by one or more measurement values. For example, depending on the state of the adaptable flow regulating device and depending on the (true) value of the wind speed, the simulation may model the airflow around the rotor blades and may also model the thereby exerted driving force of the air impacting on the rotor blades. The simulation may also model the behaviour of the generator and/or the converter for deriving electrical quantities related to the power output.

According to an embodiment of the present invention, it is provided a method of estimating a value of power output of a wind turbine, the method comprising: performing a method of estimating a value of wind speed according to one of the preceding embodiments and estimating the value of the power output based on the estimated wind speed.

The value of the power output may for example be estimated also using a simulation of the wind turbine, in particular regarding an aerodynamic and/or electrical behaviour. The estimated value of the power output may for example be utilized for deriving a compensation in case the wind turbine operator is required to curtail the wind turbines.

According to an embodiment of the present invention, it is provided a method of controlling a wind turbine, the method comprising: performing a method of estimating a value of wind speed according to one of the preceding embodiments and controlling the wind turbine based on the estimated wind speed. Thereby wind turbine control may be improved.

According to an embodiment of the present invention, the controlling includes at least one of: calibrating at least one wind sensor; scheduling at least one controller gain; setting a reference value of at least one of: a rotor speed of the rotor, pitch angle of the rotor blades. Thereby, important control functions may be supported by the embodiments of the present invention.

According to an embodiment of the present invention, it is provided a method of correcting at least one measurement value of a wind characteristic, in particular wind speed and/or wind direction, related to a wind turbine, having a rotor with plural rotor blades, the method comprising: estimating a value of the wind speed according to one of the preceding embodiments; measuring a value of the wind characteristic; and determining a corrected value of the wind characteristic based on the measured value of the wind characteristic and the estimated value of the wind speed.

The method of correcting may also be considered to comprise or be a method of calibrating at least one measurement value of a wind characteristics.

It should be understood that the features, individually or in any combination, disclosed, described or explained with respect to a method of estimating a value of wind speed a wind turbine is subjected to may also apply to an arrangement for estimating a value of wind speed a wind turbine is subjected to, individually or in any combination, according to embodiments of the present invention and vice versa.

According to an embodiment of the present invention, it is provided an arrangement for estimating a value of wind speed a wind turbine is subjected to, the wind turbine having a rotor with rotor blades at least one having an adaptable flow regulating device installed, the arrangement comprising: an input module adapted to: obtain values for power output of the wind turbine, rotor speed of the rotor, and pitch angle of the rotor blades; obtain state information of the adaptable flow regulating device; and a processor adapted to estimate the value of the wind speed based on the values for power output, rotor speed, pitch angle and the state information of the adaptable flow regulating device.

Furthermore, a wind turbine is provided, comprising a rotor having mounted thereon plural rotor blades, at least one rotor blade having an adaptable flow regulating device installed; and an arrangement according to the preceding embodiment, the input module being connected to receive the state information relating to the adaptable flow regulating device.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
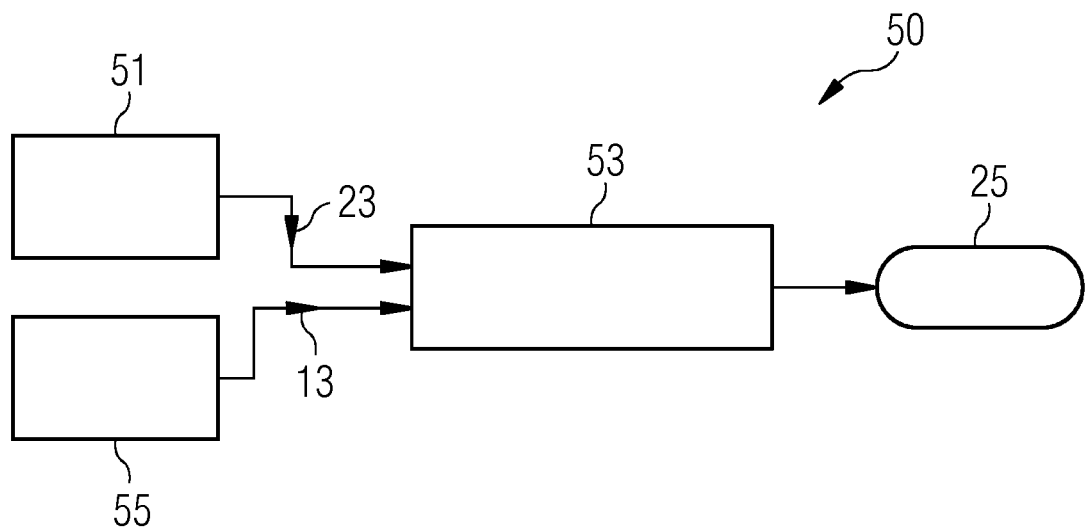
Figure 3:
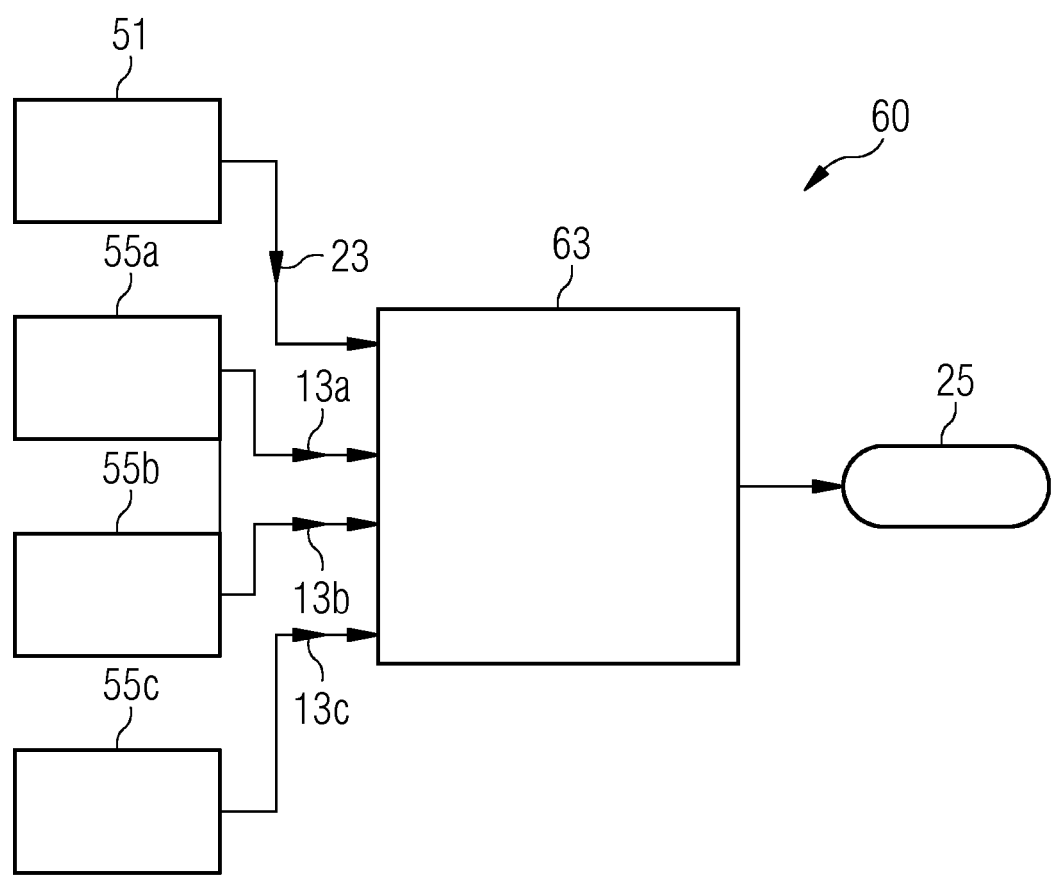

Some of the embodiments will be described in detail, with reference to the following figures, wherein like designations denote like members, wherein:

FIG. 1 schematically illustrates a wind turbine according to an embodiment of the present invention comprising an arrangement for estimating a value of a wind speed, a wind turbine is subjected to according to an embodiment of the present invention;

FIG. 2 schematically illustrated a block diagram of a method of estimating a value of wind speed a wind turbine is subjected to according to an embodiment of the present invention; and FIG. 3 schematically illustrated a block diagram of a method of estimating a value of wind speed a wind turbine is subjected to according to another embodiment of the present invention.

DETAILED DESCRIPTION

The wind turbine 1 schematically illustrated in FIG. 1 comprises a rotor 3 having mounted thereon plural rotor blades 5, at least one rotor blade 5 having an adaptable flow regulating device (collectively labeled as) 7 installed. Further, the wind turbine 1 comprises an arrangement 9 for estimating a value of a wind speed the wind turbine 1 is subjected to. In particular, the arrangement 9 is adapted to estimate the value of the wind 11 upstream the rotor blades 5 thereby utilizing state information 13 of the state of the flow regulating device 7. The value of the wind speed estimated relating to the wind 11 may comprise the value of the wind speed which is unaffected by the operation of the wind turbine. In particular, the wind characteristic, in particular wind speed of the wind 14 as may be present downstream the plane of the rotor blades 5 may be different from the wind 11 upstream of the rotor blade plane spanned by the rotor blades 5.

In the illustrated embodiment, the adaptive flow regulating device 7 comprises a spoiler 15 having spoiler portions 15*a*, 15*b*, 15*c* installed along the rotor blade 5 at the leading edge 17. Furthermore, the flow regulating device 7 comprises a flap 19 installed along at least a portion of the trailing edge 21 of the rotor blade 5.

The state information 13 thereby comprises information regarding the state of each individual spoiler portion 15*a*, 15*b*, 15*c* as well as the state information of the flap 19. In other embodiments, the adaptive flow regulating device 7 may comprise other portions. For example, the spoiler 15 may be configured as an integral spoiler not comprising several spoiler portions and/or the flap 19 may be configured as comprising several flap portions arranged along the trailing edge 21 of the rotor blade 5.

The arrangement 9 receives, beside the state information 13, further operational parameter information 23 comprising values for power output of the wind turbine, a rotor speed of the rotor and pitch angle of the rotor blades. Based on the values 23 for power output, rotor speed, pitch angle and based on the state information 13 of the adaptable flow regulating device 7, the arrangement 9 estimates the value 25 of the wind speed of the wind 11, in particular upstream the wind turbine 1, in particular representing a rotor mean wind speed.

The value 25 of the wind speed may be utilized for one or more control processes for controlling the wind turbine 1 and may in particular be utilized by the arrangement 9 also to estimate a value 27 of a power output which is output at output terminals 29 of a converter 31 which is connected to a generator 33 which is driven by the rotor 3. Furthermore, the value 25 of the wind speed may be utilized for correcting or calibrating a wind speed sensor 35 which may be installed at the nacelle 4 harboring the rotor, the generator 33, the converter 31 and also the arrangement 9.

Since the activation level of the adaptive flow regulating device 7 impacts or influences the operation of the wind turbine, in particular impacts on the rotor speed and the pitch angle and the output power, taking into account the state information 13 of the flow regulating device 7, may improve the accuracy of the estimation of the value 25 of the wind speed of the wind 11.

FIG. 2 schematically illustrates a block diagram of a method 50 as may be performed by the arrangement 9 illustrated in FIG. 1 and which may be performed according to an embodiment of the present invention. In a block 51 values for the pitch angle, the rotor speed of the rotor 3 and the power output (for example at output terminals 29) are obtained, for example measured or derived using simulation. The values 23 of these parameters are then supplied to a module 53 representing an estimated wind speed table. To this module 23 also the state information 13 is supplied which is obtained by a module 55 which for example senses the state of the flow regulating device 7 or obtains setting values. In the embodiment illustrated in FIG. 2, the state information 13 may for example encode the state information in the way that the number of active segments (for example number of spoiler portions 15*a*, 15*b*, 15*c*), which are in an on state, is specified. According to other embodiments, the adaptive flow regulating device may only comprise a spoiler or only comprise a flap. Using the estimated wind speed table in module 53, the wind speed value 25 is estimated.

FIG. 3 illustrates another embodiment of a block diagram 60 of a method as performed according to the embodiments of the present invention. In a similar module 51, the values 23 for pitch angle, rotor speed and power output are obtained and supplied to a module 63 representing an estimated wind speed table. The block diagram 60 illustrated in FIG. 3, considers the state information 13*a*, 13*b*, 13*c* from different portions of the adaptive flow regulating device 7, for example from the different spoiler portions 15*a*, 15*b*, 15*c*, respectively. The respective settings are obtained in the respective block or blocks 55*a*, 55*b*, 55*c*. Each of the individual state information 13*a*, 13*b*, 13*c* comprises either on-off information of the respective segments 15*a*, 15*b*, 15*c* or even information regarding a degree of activation, such as a degree of tilt and/or degree of protrusion of the respective spoiler portion.

The estimated wind speed table 63 is utilized to derive the wind speed 25 from the values 23 of pitch angle, rotor speed and power output as well as using the individual state information 13*a*, 13*b*, 13*c*.

Thereby, according to an embodiment of the present invention, the trim stall activation level (also representing the activation level of the adaptive flow regulating device) is added as a new dimension of the available wind speed estimation. The activation level can either be the number of segments activated according to FIG. 2 or it can be a function of the activation of the individual segments according to FIG. 3. Thereby, the activation level of the trim stall segment(s) (in particular the adaptive flow regulating device) is included into the calculation of the available wind speed. An advantage may be that the inclusion of the trim stall segment activation level may improve the available wind estimation independent of the state of the trim stall system. Embodiments of the present invention may be applied to one or more spoiler(s) or one or more flap(s) or in general any active add-on installed at the rotor blade.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of estimating a value of wind speed a wind turbine is subjected to, the wind turbine having a rotor with rotor blades at least one having an adaptable flow regulating device installed, the method comprising:
    obtaining values for power output of the wind turbine, rotor speed of the rotor, and pitch angle of the rotor blades;
    obtaining state information of the adaptable flow regulating device; and
    estimating the value of the wind speed based on the values for power output, rotor speed, pitch angle and the state information of the adaptable flow regulating device.

2. The method according to claim 1, wherein the state information of the adaptable flow regulating device comprises information regarding an activation level of the adaptable flow regulating device.

3. The method according to claim 1, wherein the adaptable flow regulating device or at least one portion of several adaptable flow regulating portions is adjustable to be in at least two states, representing different activation levels, the state information being indicative of the respective activation level.

4. A wind turbine, comprising:
    a rotor having mounted thereon plural rotor blades, at least one rotor blade having an adaptable flow regulating device installed; and
    the arrangement according to claim 3, the input module being connected to receive the state information relating to the adaptable flow regulating device.

5. The method to claim 1, wherein the adaptable flow regulating device comprises several adaptable flow regulating portions installed along the rotor blade, wherein the state information of the adaptable flow regulating device comprises state information of at least one, portion(s) of the several adaptable flow regulating portions.

6. The method according to claim 1, wherein the adaptable flow regulating device comprises:
    at least one adaptable spoiler installed at at least one of the rotor blades; and/or
    at least one adaptable flap installed at at least one of the rotor blades.

7. The method according to claim 1, wherein the adaptable flow regulating device comprises an inflatable bag or hose which is inflatable using a fluid thereby adjusting a protrusion height and/or a tilt angle of an airfoil portion of the flow regulating device from a surrounding surface of the rotor blade, wherein the state information of the adaptable flow regulating device comprises information about a degree of filling or pressure of the bag or hose.

8. The method according to claim 1, wherein estimating the value of the wind speed includes:
    deriving a relationship, between wind speed and the values for power output, rotor speed, pitch angle and the state information of the adaptable flow regulating device.

9. The method according to claim 8, wherein deriving the relationship includes performing a simulation of the dynamics and/or aerodynamics and/or electrical behaviour of the wind turbine.

10. A method of estimating a value power output of a wind turbine, the method comprising:
    performing the method of estimating a value of wind speed according to claim 1; and
    estimating the value of the power output based on the estimated value of the wind speed.

11. A method of controlling a wind turbine, the method comprising:
    performing the method of estimating a value of wind speed according to claim 1; and
    controlling the wind turbine based on the estimated value of the wind speed.

12. The method according to claim 1, the controlling including at least one of:
    calibrating at least one wind sensor;
    scheduling at least one controller gain; and
    setting a reference value of at least one of:
        a rotor speed of the rotor,
        pitch angle of the rotor blades.

13. The method of correcting at least one measurement value of a wind characteristic, related to a wind turbine, having a rotor with plural rotor blades, the method comprising:
    estimating a value of the wind speed according to claim 1;
    measuring a value of the wind characteristic; and
    determining a corrected value of the wind characteristic based on the measured value of the wind characteristic and the estimated value of the wind speed.

14. An arrangement for estimating a value of wind speed a wind turbine subjected to, the wind turbine having a rotor with rotor blades at least one having an adaptable flow regulating device installed, the arrangement comprising:
    an input module adapted to:
        obtain values for power output of the wind turbine, rotor speed of the rotor, and pitch angle of the rotor blades;
        obtain state information of the adaptable flow regulating device; and
    a processor adapted to estimate the value of the wind speed based on the values for power output, rotor speed, pitch angle and the state information of the adaptable flow regulating device.

* * * * *